Oct. 7, 1952 R. C. RIFENBURG 2,612,672
APPARATUS FOR FORMING AND LINING PIPES
Filed May 31, 1951 5 Sheets-Sheet 3

INVENTOR.
RAY C. RIFENBURG
BY Ward, Crosby & Neal
ATTORNEYS.

Oct. 7, 1952 R. C. RIFENBURG 2,612,672
APPARATUS FOR FORMING AND LINING PIPES
Filed May 31, 1951 5 Sheets-Sheet 4

INVENTOR.
RAY C. RIFENBURG.
BY
Ward, Crosby & Neal
ATTORNEYS.

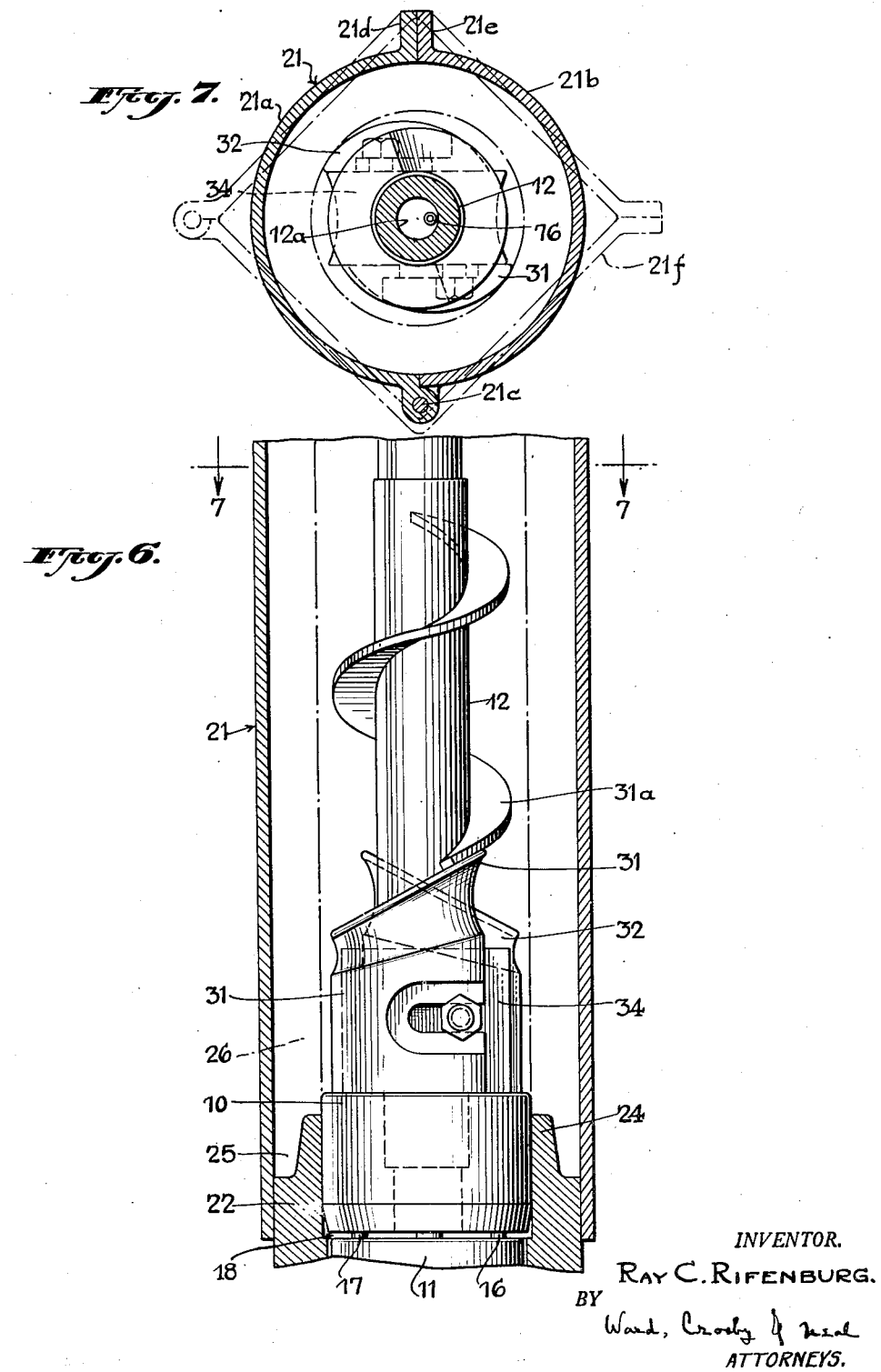

Patented Oct. 7, 1952

2,612,672

UNITED STATES PATENT OFFICE 2,612,672

APPARATUS FOR FORMING AND LINING PIPES

Ray C. Rifenburg, Brooklyn, N. Y., assignor to Consolidated Edison Company of New York, Inc., New York, N. Y., a corporation of New York Application May 31, 1951, Serial No. 229,137

17 Claims. (Cl. 25—36)

1

This invention relates to conduit-forming apparatus wherein conduits are shaped from plastic material, such as concrete and the like. The invention relates more particularly to means for applying a lining material to the interior surfaces of such conduit during the operation of the conduit-forming apparatus whereby such surfaces may be made smooth.

A conduit formed of initially plastic material, such as concrete and the like, is employed on a large scale for containing, for example, electrical cable, and, of course, for conducting fluid, the conduit usually being installed underground. Such conduit usually is formed by pouring concrete into a vertical mold, there being at the bottom of such mold a suitable mandrel which is rotated and simultaneously moved longitudinally upwardly through the mold. The mandrel, in combination with, for example, a spiral worm and spreader palms, which are movable therewith, serves to press the plastic material against the inner surfaces of the form as they rotate and rise, thereby forming a hollow shell or pipe section. The interior walls of such conduit, as formed in this way, tend to be rough and somewhat pitted so that it is difficult to draw therethrough, for example, electrical cables and the like without damage to the cables. If the conduit is for fluid, the flow thereof may be retarded by such roughness. Hence, it is the present practice to attempt to eliminate such roughness by, for example, wire brushing the insides of such conduit. But this has been found to be expensive and not altogether satisfactory.

One of the objects of the present invention is to overcome the above difficulties or to reduce same to insignificance.

The invention, in one aspect thereof, is constituted by a pair of mandrels for use with a conduit mold, which mandrels are mounted in coaxial relationship for movement axially relative to one another within preselected limits and also are mounted for rotational and longitudinal movement relative to the mold. Means are provided for supplying a conduit liner fluid, for example, cement mixed with water, to an orifice which opens upon a region between such mandrels, the opening and closing of such orifice being effected by moving the mandrels away or toward one another, that is, the orifice is controlled in response to the position of one mandrel relative to the other. The conduit mold customarily is in a vertical position, the mandrels initially being positioned at the bottom region of the mold when concrete is poured thereupon, the mandrels there-

2 upon being rotated and raised to shape the conduit by pressing the plastic material against the inner sides of the mold. The conduit liner fluid is distributable uniformly to all parts of an exit port formed between said mandrels, such port coming into existence in response to the separation of such mandrels. One of the mandrels acts to smooth the conduit liner fluid uniformly against the inner surface of the conduit as it is formed, such inner surface becoming relatively very smooth and of much lower coefficient of friction and thus less abrasive as compared with inner surfaces in conduits formed in apparatus of the character heretofore suggested. The mandrels preferably are drivably associated with a shaft by which they may be rotated and longitudinally moved relative to the mold. Such shaft may be provided with a passage through which the liner fluid is directed to the region between the mandrels. Means may be provided for resiliently urging said mandrels together whereby said port is urged toward a closed condition. The liner fluid may be directed to the mandrels under pressure sufficient to overcome such resilient means thereby to open said port. Means are provided for controlling the flow of liner fluid to the mandrels in response to preselected positions of said mandrels longitudinally of the mold.

Various, further and more specific objects, features and advantages of the invention will clearly appear from the detailed description given below taken in connection with the accompanying drawings which form a part of the specification and illustrate, by way of example, preferred arrangements of apparatus for carrying out the invention. The invention consists in such novel combinations of features as may be shown and described in connection with the apparatus herein disclosed.

In the drawings:

Fig. 6 is a side elevation, partly in section and with parts broken away, of a conduit mold and certain shaping heads therein; and Fig. 7 is a sectional view taken substantially along line 7—7 of Fig. 6.

Figure 1:
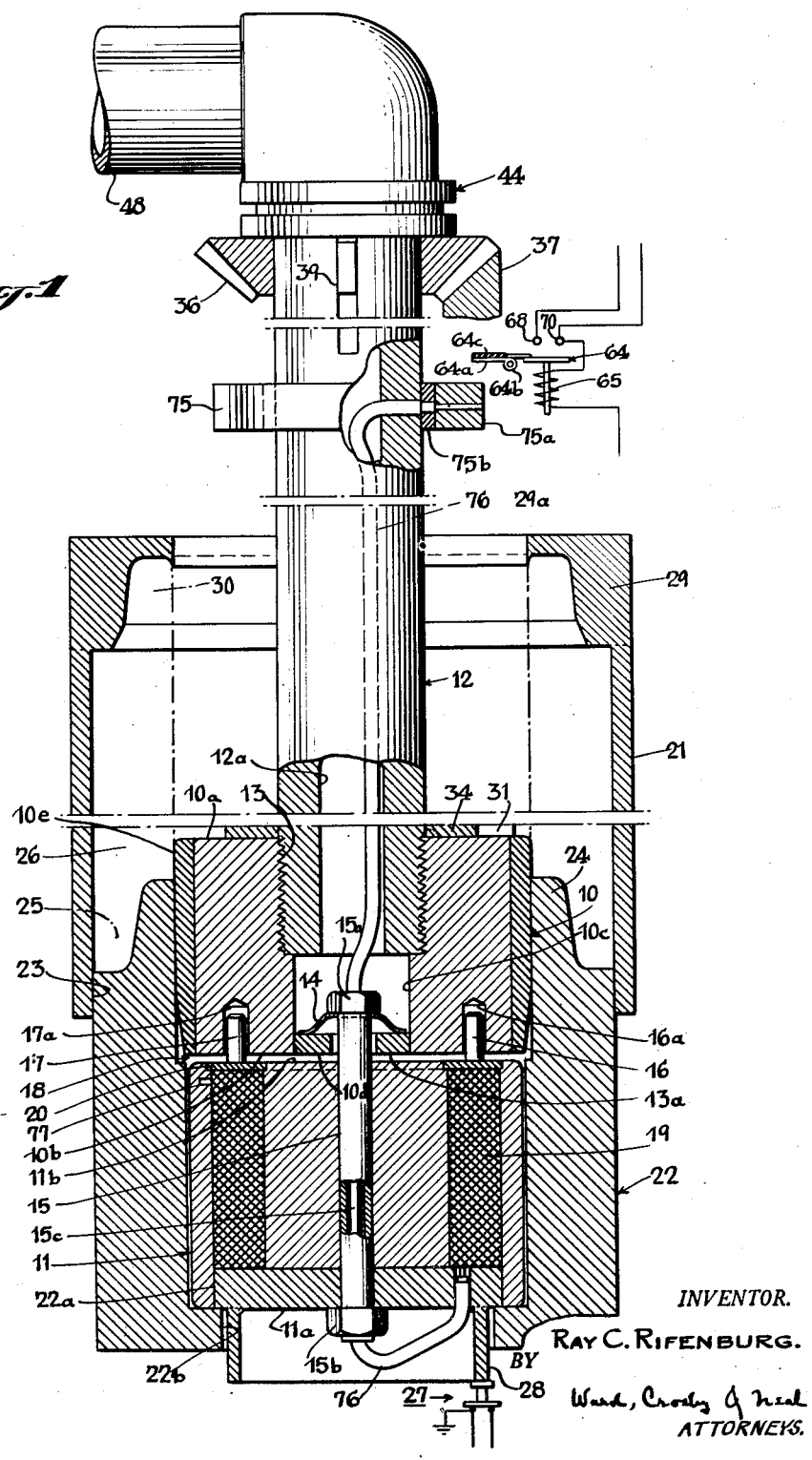
Fig. 1 is a side view, partly in section and with parts broken away, showing one embodiment of the present invention.

Referring to the drawings, the novel conduit-forming structure is well illustrated in Fig. 1 wherein there are shown the two mandrels which are associated in a novel manner to appear herebelow. Such mandrels are herein designated as a bore mandrel 10 and a trowel mandrel 11. These mandrels are drivably associated with a shaft member 12 in any suitable manner and in the form shown such shaft is firmly secured to the bore mandrel 10 centrally and coaxially thereof by a threaded engagement therebetween as at 13. The shaft 12 and bore mandrel 10 may be locked in such threaded engagement by any conventional means for this purpose.

The mandrels 10 and 11 preferably are of metal construction and are of generally cylindrical conformation, the surfaces thereof which act upon the inner surfaces of the conduit preferably being cylindrical although it is possible for other suitable surfaces of revolution to be employed. The shaft 12 is provided with a longitudinal passage 12a therethrough for the purpose of conducting the conduit liner liquid to the mandrels as will appear more fully herebelow.

The bore mandrel 10 is provided with an outer end face, as at 10a, and an inner end face as at 10b, and also with a passage therethrough as at 10c having an orifice 10d in face 10b. The trowel mandrel 11 is preferably of slightly less diameter than the bore mandrel 10 and is also provided with an outer end face 11a and an inner face 11b. The latter face is shaped for conforming to the inner end face 10b of the bore mandrel 10 whereby orifice 10d is closable in response to the movement of the faces 10b and 11b into engagement. A replaceable sleeve 10e may be shrunk upon and form part of the mandrel 10.

The trowel mandrel 11 may be drivably associated with said shaft 12 via said bore mandrel 10, that is, the trowel mandrel may be mounted upon the bore mandrel 10 for angular and axial movement therewith. The means for so mounting such mandrels is constituted, for example, by an open spider 13a, which supports a resilient member or spring 14 which, for example, may be in the form of a flat U and which, via an interconnecting bolt 15, exerts a thrust upon the trowel mandrel 11 which urges said mandrels together, that is, urges the inner end faces 10b, 11b towards one another. The interconnecting bolt 15 is provided with a head 15a and a nut 15b, the latter element engaging a suitable threaded portion at the outer extremity thereof and also engaging the outer end face 11a of the mandrel 11. The nut 15b may be turned to a desired position for adjusting the tension upon the spring 14. Said bolt 15 preferably has a passage therethrough at 15c for a purpose to appear hereinafter.

The above-mentioned spring and bolt structure 14, 15 interconnects the mandrels for axial movement together, and also adapts them for movement away or towards one another within preselected limits. Suitable means are provided for insuring that they also rotate together comprising a plurality of dowels, as at 16 and 17, which are rigidly secured to one of the mandrels, for example, 11, and which engage loosely within corresponding recesses, as at 16a, 17a, formed in the other mandrel, such as 10.

It will be seen from the above-described structure that a conduit liner liquid directed through the passage 12a, 10c, will again egress through an annular port 18 formed between the mandrels when inner end faces 10b, 11b are separated, and such liquid may be directed to such faces under pressure adequate to overcome the spring 14 thereby to separate such faces and to open the port 18. Such port comes into existence, in the form shown, only upon separation of the end faces 10b, 11b. The spring 14 may be capable of closing the port 18 when the pressure of the liner liquid is reduced, for example, to atmospheric. However, under some circumstances it is desirable to accelerate the closing of the port 18, that is, the closing of the faces 10b, 11b by supplementary means as when a very viscous liner liquid is employed. Such means are constituted by an electromagnet, as at 19, which may be annular in conformation and which, in the form shown, fits into a corresponding annular recess formed in and concentric with the mandrel 11. In order to cover such recess, an annular brass plate 20 is provided, the upper surface thereof (Fig. 1) being flush with and comprising a part of the inner end face 11b.

The mandrels 10 and 11 may be employed with advantage in the so-called vertical mold method for forming a conduit from plastic material, such as concrete, and such a vertical mold is shown in Fig. 1 at 21, which mold is cylindrical in shape with a circular cross-section. The mold cross-section may be polygonal, for example, square. A well member 22 is mounted at the bottom of the mold 21, such well member having outer dimensions preferably the same as the inner dimensions of the mold 21 whereby it can be secured to such mold in the area indicated generally at 23. The upper portion of well member 22 is provided with a flange as at 24 which, in cooperation with the mold 21, will form a suitable joint portion 25 in the conduit. Such conduit is indicated generally in Fig. 1 at 26.

The well member 22 provides a housing for the mandrels 10 and 11 when they are in their lowermost position, as viewed in Fig. 1, and such well member is provided with a mandrel seat in the form of an inturned annular lip, as at 22a, for the purpose of providing a support for the mandrel 11 and in turn mandrel 10 when they are in their lowermost positions. In order to assist in aligning these mandrels as accurately as possible at the outset of their longitudinal and upward movement through the mold 21, the well member 22 may be provided with inner bore diameters which are only slightly larger than the diameters of the bore mandrel 10 and the trowel mandrel 11. That is, such inner bore diameters of the well member 22 are slightly in excess of the diameters of the corresponding mandrels in order to permit free axial movement thereof.

The inwardly extending annular lip 22a defines an opening in the bottom of the well member, as indicated at 22b, which permits an operative interconnection between the mandrels 10, 11, and the switch 27 which is employed as an element in the means for controlling the pressure of the conduit liner liquid. The switch 27 is normally open. However, when the mandrels are in the position shown in Fig. 1, the switch is urged to a closed position through the intermediary of an annular ring 28 which is secured to the lower mandrel 11.

Also, as shown in Fig. 1, the mold 21 may have associated therewith a cap member 29 having a central opening 29a through which the plastic material is poured. The cap member 29 may be shaped, as shown, to form, in combination with the bore mandrel, a joint portion 30 in the conduit 26.

As above mentioned, it is the normal practice in apparatus of this kind to hold the mold 21 in a vertical position and to pour the plastic material, such as concrete, in at the top through opening 29a, and thereupon to rotate and raise the conduit-shaped mandrel. In order initially to assist in pressing the concrete so poured into the mold against the interior surface thereof the following may be employed: (a) a primary head 31a having large helical threads formed in the side surface thereof; and (b) a plurality of spreader palms as are well illustrated in Figs. 6 and 7 at 31 and 32. Such spreader palms preferably are rigidly secured to the rotatable shaft 12 by means of a collar 34 which may embrace said shaft and may be keyed thereto as by key 35.

Figure 3:
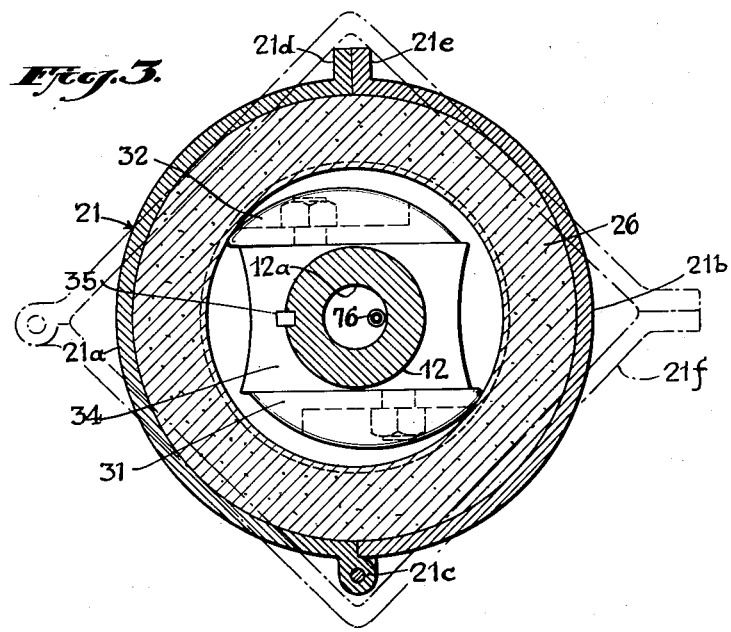
Fig. 3 is a sectional view taken substantially along line 3—3 of Fig. 2.

Also shown in Fig. 3 is a commonly used form of mold 21, the latter being divided into halves 21a, 21b which are hinged, as at 21c, thereby permitting an easy opening of the halves after the formation of the conduit. Such halves 21a, 21b also may be provided with longitudinally extending end flanges 21d and 21e at a point preferably opposite to the hinge 12c whereby the mold halves may be secured together by any suitable fastening means. A mold having the above-mentioned square cross-section is indicated in broken lines at 21f (Figs. 3 and 7).

It will be seen that the primary head 31a and the spreader palms 31—33, being mounted above the bore mandrel 10, will initially act upon the plastic material and by centrifugal force will press same outwardly toward the inner surface of the mold 21, thereby preparing such surface for the bore mandrel 10.

Figure 2:
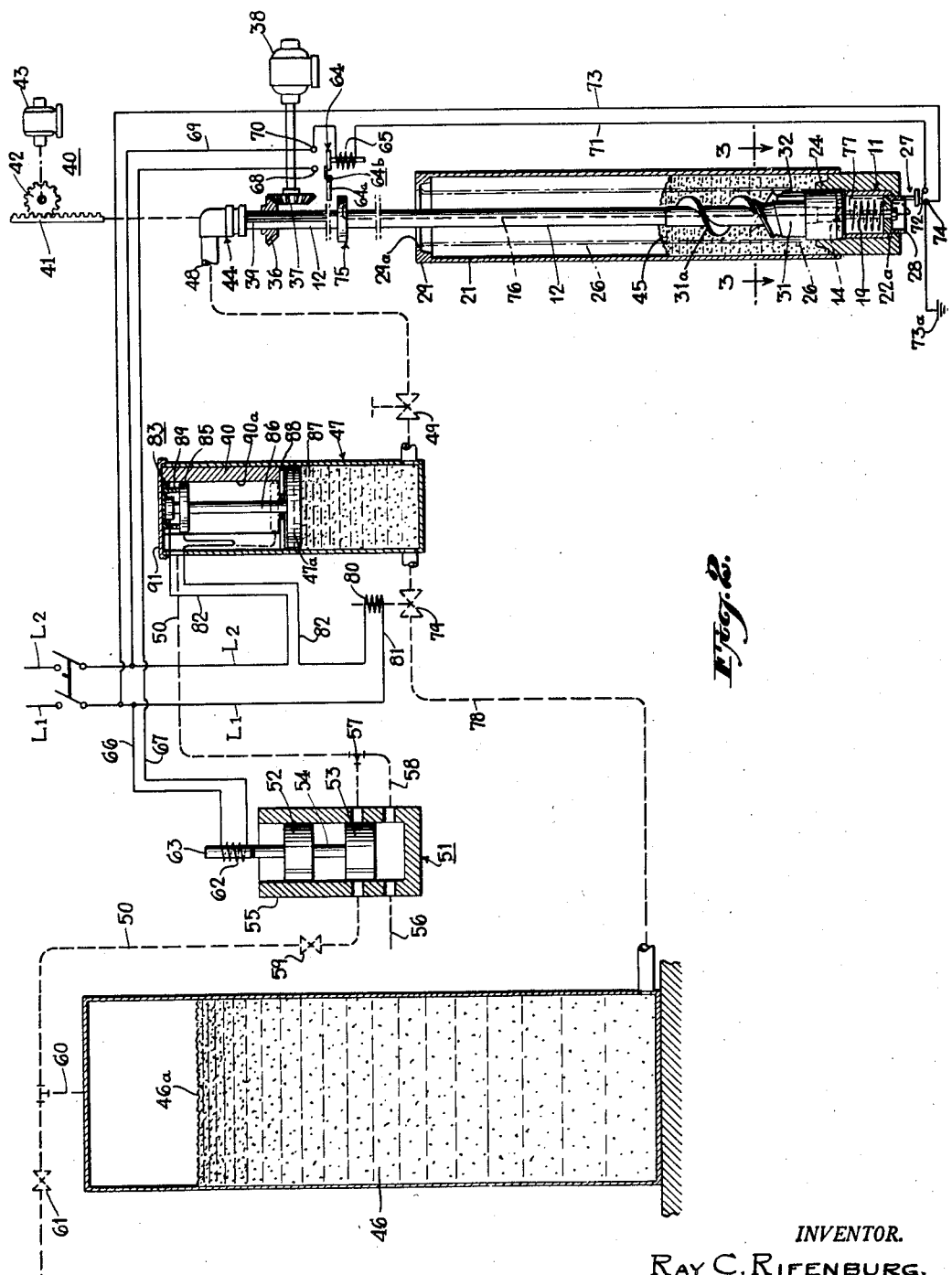
Fig. 2 is a schematic diagram of one form of the invention including the parts shown in Fig. 1 and also illustrating one form of wiring diagram for operatively associating various elements of this form of the invention, and also showing means for controlling the flow of fluid in this form of apparatus.

Referring now to Fig. 2, it will be seen that the mandrels 10 and 11 are here shown near their lowermost position but slightly raised above their position, as shown in Fig. 1.

As above mentioned, the hollow shaft 12 is mounted for rotational movement and also for movement longitudinally of the mold 21 whereby said mandrels are raised upwardly through the plastic material in the mold thereby to form the conduit. As schematically indicated in Fig. 2, the shaft 12 is rotatable by means of a pair of bevel gears as at 36 and 37, the latter being operatively connected to a torque source, such as electric motor 38, for driving said gears. The bevel gear 36 may be held axially stationary relative to the mold 21 by suitable means (not shown) and may surround the shaft 12 and be keyed thereto, as by a key 39, whereby torque is communicated to the shaft by the motor 38 causing said shaft to rotate and at the same time permitting it to be raised or lowered relative to the mold 21.

The means for raising the shaft 12, that is, the means for shifting same longitudinally through the mold 21, may consist, for example, of a rack and pinion device indicated generally at 40 and comprising a rack 41 and a pinion 42, the latter being drivably associated with a torque source, as at 43, also comprising an electric motor. The rack 41, by any suitable means, is connected to the shaft 12, for example, through a swivel joint indicated generally at 44 (Fig. 2) which will communicate axial thrust to the shaft 12 from the rack and pinion 40 and still permit said shaft to rotate under the influence of the motor 38. Such swivel joint 44 may be provided with suitable thrust bearings for communicating such thrust of the rack and pinion mechanism and, as will be described in connection with the means for directing conduit liner liquid to the mandrels, the swivel joint 44 may also be employed as a device for connecting a flexible conduit to the rotating shaft 12 thereby to conduct such liquid to the passage 12a in the shaft while the latter is rotating. Suitable means (not shown) may be employed for restraining such swivel joint from rotation thereby preventing twisting of such flexible conduit.

As shown in Fig. 2, the plastic material, such as concrete, may be poured in small increments into the mold 21. An upper surface, indicated by a broken line at 45, is formed by one or more of such increments, such material being shaped to form the conduit 26 by the primary head, spreader palms and mandrels in a manner which will be more fully described hereinafter.

The conduit liner liquid, as above mentioned, is directed to the mandrels 10, 11 under pressure (see Fig. 1). The port 18 is openable, in the form shown, under the influence of such liquid pressure, whereby the liquid can gain access to the inner surfaces of the conduit in a uniform and highly advantageous manner by virtue of the annular conformation of the port 18.

It has been found desirable to force said port 18 open, that is, to separate such inner end faces, under the influence of such liquid pressure at the outset of the conduit-forming operation and to arrest the flow of such liquid by removing such pressure upon the liner liquid at the termination of the conduit-forming operation whereby the resilient means 14 can urge such inner end faces into reengagement thereby to close the port 18. Such closing, as above mentioned, may be assisted by the action of the electromagnet 19, if desired. It is desirable to provide means for quick dissipation of the pressure upon such conduit liner liquid when the port 18 reaches the top of the conduit. I have determined, in order to accomplish such quick pressure dissipation, that two tanks for the liquid should be employed, including a master tank indicated at 46 and an intermediate tank at 47 (Fig. 2). The latter tank is of relatively small volume compared to the former and is of such volume that it is possible, upon opening of an exhaust valve to the atmosphere, for the pressure therein quickly to be reduced to atmospheric. Thus a disadvantageous delay in the reduction of conduit liner liquid pressure is avoided which might otherwise occur if an effort were made to dissipate such pressure in a relatively large tank, as at 46.

The conduit liner liquid can consist of any suitable substance which, when smoothed against the interior of the conduit while in the process of formation, will smooth the inner surface of the conduit, make a permanent bond therewith and thereby reduce the coefficient of friction of such surface and make it relatively low in abrasive qualities. I have found it advantageous to employ, for example, any one of the following:

(a) So-called neat cement comprising a mixture of cement with water;

(b) Grout which comprises a mixture of fine sand with cement and water; and (c) A mixture with either (a) or (b) of finely ground soapstone.

The liner tank 47 is connected to the shaft 12 via a conduit indicated schematically in Fig. 2 at 48 via said swivel joint 44. The conduit 48 is flexible in order that it may follow the movements of the shaft 12 as it shifts longitudinally. A twisting of the conduit 48 is avoided by virtue of the swivel joint means above described. If desired a valve, as at 49, is interposed in the conduit 48.

The conduit liner liquid is forced from the tank 47 to the shaft 12 and hence to the mandrels 10, 11 under the influence of fluid pressure in tank 47, for example, air under pressure, such air being conducted to the upper portion within the tank 47 by means of a conduit indicated at 50. Interposed in the conduit 50 is selector valve 51 which is controlled in accordance with the longitudinal position of the mandrels 10, 11 in the mold 21 and which controls the flow of air under pressure to the tank 47. The selector valve in one position connects the upper region within the tank 47 to the atmosphere via an exhaust port and in a second position closes the exhaust port and connects such region to the source of air under pressure. The selector valve 51 is provided with shuttle valve members 52 and 53 which are rigidly secured to a valve shaft 54 and which are axially shiftable within a valve body 55. In the position of the shuttle members 52, 53, as shown in Fig. 2, the latter shuttle member closes the conduit 50 thereby preventing the application of pneumatic pressure upon the liquid in the tank 47 and opening such tank to atmospheric pressure via an exhaust conduit 56. By means of a T-joint 57 and a conduit 58, the conduit 50, at the location between tank 47 and valve 51, is connectable to the exhaust conduit 56 as shown in Fig. 2.

A reducing valve 59 is provided in the conduit 50 at a point intermediate the selector valve 51 and a conduit 60 which interconnects the conduit 50 to the master or larger tank 46. Thus a higher pneumatic pressure is exerted upon the liquid in the tank 46 as compared to that in tank 47. The purpose of such a reducing valve is to permit liquid from the larger tank 46 to flow into the smaller tank 47 at the same time as the exertion of a desired pneumatic pressure upon the liquid in the tank 47.

The pressure regulating valve 61 may be provided in the conduit 50 at a point between the source of air pressure and the conduit 60.

The selector valve 51, as above explained, is controlled in accordance with the position of the mandrels 10, 11 longitudinally of the mold 21. Thus the pneumatic pressure exerted upon the liner liquid in the tank 47 is governed in accordance with such longitudinal position. The means for so controlling the selector valve 51, in the form shown, are constituted as follows: A solenoid 62 having a plunger 63 is operatively connected with the shuttle valve members 52, 53 of the selector valve 51. When the solenoid 62 is energized, the shuttle valve members 52, 53 are moved to the position shown in Fig. 2 whereas when such solenoid is deenergized such shuttle valve members will fall to their lowermost position wherein the exhaust conduit 56 is closed and pneumatic pressure is exerted upon the tank 47, the air under pressure passing between the shuttle valve members 52, 53. The solenoid 62 in turn is under the influence of a switch 64, the latter being under the control of a solenoid 65, and a collar 75.

One extremity of solenoid 62 is connected to one side $L_1$ of power line $L_1$, $L_2$, by a lead 66, the other extremity of such solenoid being connected to the other side $L_2$ by means of a lead 67 extending to a terminal 68 of said switch 64 and by a lead 69 which interconnects another terminal 70 of such switch 64 to said power line $L_2$.

The solenoid 65 controlling the switch 64 is under the influence of the above-mentioned switch 27, which is normally open, but which is closable in response to the mandrel 11 being seated in its lowermost position, as shown in Fig. 1. The circuit in which the solenoid 65 is connected comprises said lead 69, a lead 71 which interconnects the terminal 70 with a terminal 72 of the switch 27, a lead 73 which interconnects the power line $L_1$ to another terminal 74 of said switch 27.

The switch 64, in addition to being operable by the solenoid 65, is also operable in response to said mandrels reaching a position at or near the upper extremity of their travel, as viewed in Fig. 2, through the intermediary of a collar 75 which is rigidly secured to the shaft 12. The closing of the switch 64 by such collar will energize the solenoid 62 thereby actuating the selector valve to remove the pneumatic pressure upon the liquid in tank 47, and to place such liquid under atmospheric pressure. Such collar 75 is well illustrated in Fig. 1 and is constituted by an outer electrically conducting metal portion 75a and an inner portion 75b which electrically insulates same from the shaft 12 for a purpose to be apparent hereinafter.

The switch 64 is closable by upward movement of the collar 75 through the intermediary of a resilient arm 64a which is pivotally associated with such switch whereby the collar 75 can engage such arm, urge the switch to a closed condition and, by distorting the resilient arm, move therepast and leave the switch in a closed condition. Suitable resilient means are employed for holding the arm 64a in a preselected attitude relative to the switch 64 whereby such engagement for closing of the switch can occur in response to upward movement of the collar. But upon return or downward movement of such collar the arm 64a will permit the passage of such collar without opening of the switch 64, that is, the arm 64a can shift angularly about a pivot 64b to permit such downward passage of the collar. The arm 64a is insulated on the upper side at 64c to prevent closing the circuit through the electromagnet on the downward passage of the collar 75. The periphery of collar portion 75a should be of sufficient width so that arm 64a can make contact therewith for a time interval adequate to effect energization of magnet 19 during a period up to several seconds in order to insure closure of port 18.

In order to assist the spring 14 in closing the port 18 when the mandrels reach a preselected longitudinal position at or near the uppermost position thereof, the electromagnet 19 is energized in response to the closing of said switch 64 by the collar 75. This is accomplished by means of an electrical lead 76 (Figs. 1 and 2), which is connected at its upper extremity to the portion 75a of the collar 75 and at its lower extremity to the electromagnet 19. Said electrical lead 76 preferably extends through a passage 15c formed in the bolt 15. As schematically indicated in Fig. 2, said lead 76 is connected to one extremity of the electromagnet 19, the other extremity of such electromagnet being grounded as at 77. Thus when the collar 75 closes said switch 64, an electric circuit is completed during the period of engagement of collar 75 and arm 64a, such circuit comprising the lead 69, arm 64 and 64a, collar 75, lead 76, coil 19 and thence from the ground at 77 through the shaft 12 and the grounded framework of the machine to the grounded lead 73a and thence to the lead 73.

Figure 4:
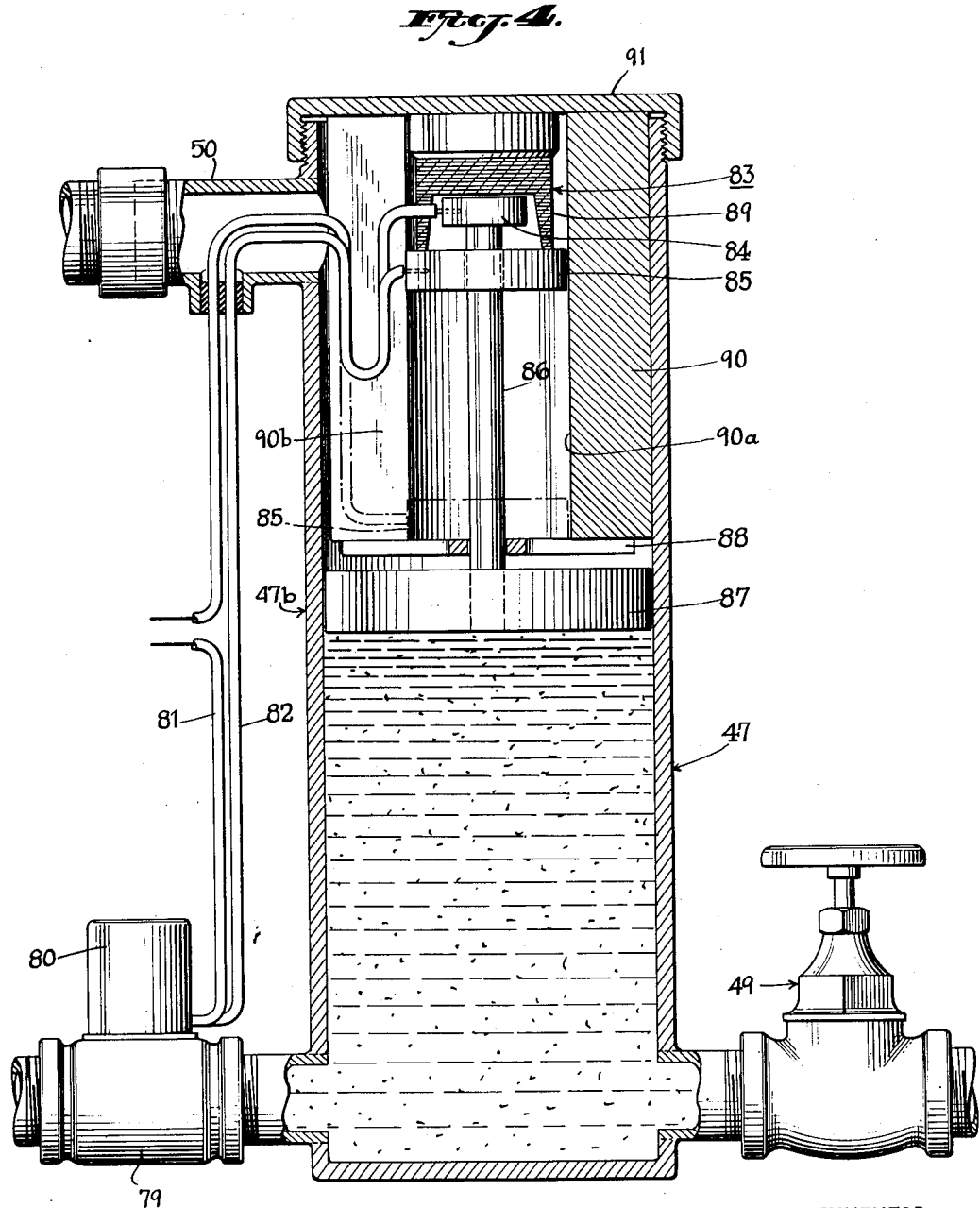
Fig. 4 is a detailed side view, partly in section and with parts broken away, of tank means employed in the present invention.

The means for controlling the level of conduit liner liquid in the tank 47 will now be described, reference being had to Fig. 2 wherein the master liner tank 46 is connected preferably near the bottom thereof to a point near the bottom of the tank 47 by means of a conduit 78. The latter has normally closed valve 79 therein under the influence of a solenoid 80. As above mentioned, air pressure at all times is exerted upon the upper surface, as at 46a, of the liquid in the tank 46. A lower air pressure is exerted upon the upper surface, as at 47a, of the liquid in the tank 47, such pressure being lower by virtue of the reducing valve 59 above mentioned. When the solenoid 80 is energized, the normally closed valve 79 is opened thereby permitting liner liquid to flow from tank 46 into tank 47. The valve 79, via said solenoid 80, is controlled by the depth of the liquid in the tank 47 by the following means: The solenoid 80 at one extremity thereof is connected by a lead 81 to the power line $L_1$, the other extremity of such solenoid being connected to power line $L_2$ by a flexible lead 82. Switching means, as at 83, are interposed in one of such leads, such as 82, which are under the influence of a device responsive to the depth of the liquid in tank 47. Such switching means are illustrated in detail in Fig. 4 and are constituted by a switch contact 84 and another switch contact 85. The former is constituted by a magnetized member which attracts to itself the contact 85, the latter being in the form of a collar loosely embracing a shaft 86 of insulating material, such as laminated phenolic. When said contact members 84, 85 are in engagement, the solenoid is energized thereby opening the valve 79. Means are provided for separating said contact members in response to the liquid in tank 47 reaching a preselected high level, such means comprising a float 87 to which is secured the shaft 86. Said contact 84 is rigidly secured to the upper extremity of the shaft 86 whereas the contact 85 is axially shiftable along said shaft when not held against the magnetized contact 84. The contact 85, as shown in Fig. 4, is shiftable between an upper extreme position shown in solid lines and a lower extreme position shown in broken lines. In the latter position such contact 85 is supported by means of an open spider 88 similar in shape to open spider 13a. When the tank 47 is empty or the liquid therein reaches a preselected low level, the float 87 will be depressed sufficiently to allow magnetized contact 84 to attract and engage the contact 85. When the liquid level in tank 47 rises to a preselected point, as at 47b, the contacts 84, 85 will be separated by means of a cup member 89 of insulating material by virtue of the smaller diameter of the contact 84 which is capable of movement to the inner surface of the cup whereas the larger contact 85 will engage the cup lip and be restrained from following the contact 84 whereupon contact 85 will be removed from the magnetic influence of the contact 84, and will drop to the lowermost position shown in broken lines (Fig. 4).

It is desirable for the shaft 86 to be centrally attached to the float 87 and to the contact 84 and to pass through a centrally located bore in the contact 85. The cup 89 is rigidly secured to the upper inner surface of the tank 47.

Figure 5:
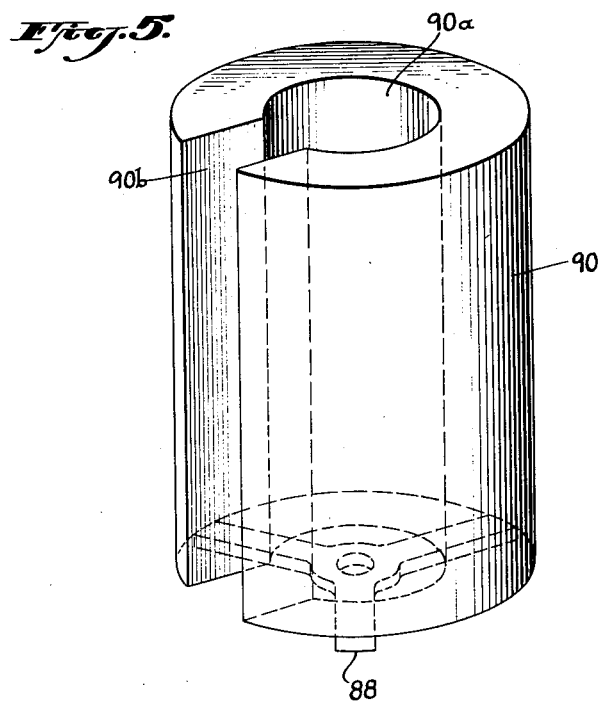
Fig. 5 is a view of a collar element employed in the apparatus shown in Fig. 4.

It has been found desirable to provide a so-called filler collar 90 (Fig. 5) for occupying the region between the open spider 88 and a cap 91 for the tank 47. The filler collar has a central bore 90a therein to accommodate the cup member 89 and the path of movement of the contact 85. A slot 90b is also provided in said filler collar for accommodating the movements of the flexible lead 82 and to provide communication between the conduit 59 and the liquid surface in the tank 47. The purpose of the filler collar is to keep the volume of pressure fluid to a minimum in order more quickly to reduce the pressure once the valve 54 in tank 51 is opened to the atmosphere.

In operation, the mandrels 10 and 11 are initially moved to their lowermost position with the mandrel 11 seated against the seat 22a and the inner end faces 10b, 11b in engagement whereby the orifice 10d, and hence the port 18 are closed. When the mandrel 11 is so seated, the normally open switch 27 is closed by means of the annular member 28 (Fig. 1) thereby completing the circuit of the solenoid 65, energizing same and opening the switch 64, assuming the latter initially to be closed. The opening of the switch 64 breaks the circuit of the solenoid 62 thereby causing the shuttle valve members 52, 53 to drop from the position shown in Fig. 2 to their lowermost position thereby closing the conduit 56 which theretofore was in communication with tank 47 and opening conduit 50 to the passage of air under pressure to the tank 47. Such pneumatic pressure may, for example, be about 20 p. s. i. upon the liquid level 47a whereupon the liquid is forced from the tank 47 to the orifice 10d via the conduit 48, the shaft 12 and passage 10c. The electromagnet 19 at this time is deenergized and port 18 is held closed by the spring 14 and also by the force of gravity acting upon the bore mandrel 10 and the shaft 12. The plastic material, such as concrete, may now be poured into the mold 21 at a pre-selected rate, and the mandrels are then rotated and raised by energizing the motors 38 and 43. It has been found desirable to rotate the shaft 12 and hence the primary head spreader palms and mandrels at approximately 300 R. P. M. When the trowel mandrel 11 has been lifted off of the seat 22a, as shown in Fig. 2, the action of the liner liquid under pressure, in combination with the action of gravity upon the lower mandrel 11, exerts sufficient force to overcome the spring 14 thereby to separate the inner end faces 10b, 11b and thus to open the port 18. The spreader palms 31, 32 (Figs. 6 and 7), acting in combination with the primary head 31a, initially throw the plastic material against the inner interior surfaces of the mold and the bore mandrel 10 thereafter presses same thereagainst. The port 18 being open, the conduit liner liquid is uniformly distributed over the interior surfaces of the conduit so formed as such port passes such interior surfaces, and the trowel mandrel 11 smoothes the liner liquid against the interior conduit surfaces in a troweling action which produces a smooth inner surface of the conduit of relatively low coefficient of friction. When the port 18 reaches the top of the conduit, the flow of liner liquid must be arrested. This is accomplished by the collar 75 (Fig. 2) closing the switch 64 which immediately energizes the solenoid 62 and places the upper region within the tank 47 in communication with the atmosphere via the exhaust conduit 56 whereby the pneumatic pressure above the liquid level 47a is released and the pressure is substantially instantaneously reduced to atmospheric by virtue of the relatively small volume between the level of the liquid in such tank and the orifice of conduit 50. Coincident with the reduction of pressure of the liner fluid, the electromagnet 19 is momentarily energized by virtue of the collar 75 engaging said arm 64a, and by means of the aforementioned circuit, said electromagnet thereby assisting in promptly closing the port 18. The mandrels 10 and 11 must be lifted entirely out of the mold 21 and consequently the shaft 12 is urged upwardly after the collar 75 engages the arm 64a. As above explained, said arm is of resilient construction and bends to permit the passage of the collar 75 and thereupon is disconnected therefrom whereby the electromagnet 19 is deenergized. Consequently the electromagnet is energized only during the period of engagement of said collar 75 and arm 64a.

While the invention has been described with respect to a preferred example which will give satisfactory results, it will be understood by those skilled in the art after understanding the invention that various changes and modifications may be made without departing from the spirit and scope of the invention, and it is intended therefore in the appended claims to cover all such changes and modifications.

What is claimed as new and is desired to be secured by Letters Patent is:

1. For use with a mold in a conduit-forming apparatus, a pair of mandrels; means for mounting said mandrels for movement between a relative position wherein they are in engagement and another relative position wherein they are separated by a preselected distance; one of said mandrels having a passage therein with an orifice positioned for being closed when said mandrels are in engagement; and means for supplying a fluid material to such passage, such material having egress to the conduit in response to the separation of said mandrels.

2. For use with a mold in conduit-forming apparatus, a pair of mandrels mounted for movement relative to one another within preselected limits, said mandrels having inner end faces shaped for engagement, a port formed between said mandrels being closable in response to engagement of such faces and operable in response to the separation of such faces, said mandrels being mounted for movement longitudinally of and rotation in the mold, and means for directing a liquid to a region between said mandrels, such liquid having egress through such port in response to the opening of the latter.

3. For use with a mold in conduit-forming apparatus, a bore mandrel; a trowel mandrel; means for mounting said mandrels for movement relative to one another, one of said mandrels having a passage with an orifice in a face thereof which is closable in response to said mandrels assuming a preselected relative position; means for mounting said mandrels for rotational and longitudinal movement relative to the mold; and means for supplying a conduit liner material to such passage, such material gaining egress to the inner surface of the conduit being formed in the mold, in response to said mandrels moving out of such preselected relative position.

4. For use with a mold in a conduit-forming apparatus, a shaft mounted for longitudinal and rotational movement in the mold, a bore mandrel, a trowel mandrel, said mandrels being drivably associated with said shaft for movement therewith, said mandrels having adjacent end faces, said shaft having a passage therein in communication with an orifice in one of said end faces, and means for mounting said mandrels for movement within preselected limits towards and away from one another, such orifice being closable in response to movement of said mandrels to a preselected relative position.

5. A conduit-forming apparatus including in combination: a mold, a shaft longitudinally and rotatably movable in said mold, a bore mandrel, a trowel mandrel, said mandrels being drivably associated with said shaft for movement therewith, said mandrels having conforming inner end faces, said shaft having a passage therethrough in communication with an orifice in one of said end faces, such passage being closable in response to engagement of said inner end faces, and means for mounting said mandrels for movement toward and away from one another for controlling a flow of fluid through such orifice.

6. For use with a conduit mold in conduit-forming apparatus, a pair of mandrels mounted in coaxial relationship for movement axially relative to one another within preselected limits, said mandrels having inner end faces, one of said mandrels having a passage therein with an orifice at its respective inner end face, a passage of fluid through such orifice being controllable in response to the axial positions of said mandrels relative to one another; means for rotating said mandrels and simultaneously moving same axially within and relative to the conduit mold; and means for controlling the position of said mandrels relative to one another.

7. For use with a conduit mold in conduit-forming apparatus, a bore mandrel; a trowel mandrel mounted coaxially with said bore mandrel for axial movement relative thereto within preselected limits, said mandrels having inner end faces, one of said mandrels having a passage therein with an orifice at the respective end face thereof; means for controlling the spaced position of said mandrels relative to one another; means for rotating said mandrels and simultaneously moving same axially relative to the mold for pressing plastic material against the interior surface of the hold to form a conduit; and means for directing a conduit liner fluid to the passage in one of said mandrels, such fluid, in response to the separation of said mandrels, having a passage to the interior surface of the conduit portion formed of such plastic material so pressed against the mold and being smoothable against such surface by one of said mandrels.

8. Apparatus in accordance with claim 7 wherein said means for directing conduit liner fluid to said mandrels includes a master fluid liner tank, an intermediate fluid liner tank of smaller capacity than said master tank, and means for controlling the flow of liner fluid from said master tank to said intermediate tank in response to the level of such fluid in the latter tank, and means for controlling flow of liner fluid from said intermediate tank to said mandrels in response to the latter passing preselected axial positions in the mold.

9. Apparatus according to claim 7 including means for controlling the flow of such conduit liner fluid in response to the position of said mandrels axially relative to the mold.

10. For use with a conduit mold in conduit-forming apparatus, a pair of mandrels, one of said mandrels having a passage therein, said mandrels having conforming inner end faces; means for mounting said mandrels for axial movement relative to one another within preselected limits for opening or closing an orifice of such passage in one of the inner end faces, said mandrels being positionable initially at a bottom region of the conduit mold; means for rotating said mandrels and for moving same longitudinally of the mold for pressing plastic material against the inner sides of the mold; means for controlling the movement of said mandrels relative to one another; and means for directing a conduit liner fluid to such passage in one of said mandrels, such fluid flowing between said mandrels in response to the separation thereof, such fluid being smoothable against the interior surface of a conduit formed of such plastic material by at least one of said mandrels.

11. For use with a conduit mold in conduit-forming apparatus, a bore mandrel having an inner end face and a passage therein with an orifice in such face; a trowel mandrel having an inner end face formed for conforming to said first-named inner end face; means for mounting said mandrels in coaxial relationship for movement axially relative to one another within preselected limits, said inner end faces being movable to close engagement for closing such passage and being separable within such limits for opening same to permit the egress of fluid from between said mandrels; means for controlling the position of said mandrels relative to one another; and means for rotating said mandrels and simultaneously moving same longitudinally of the mold.

12. For use with a conduit mold in conduit-forming apparatus, a pair of mandrels each having conforming inner end faces, one of said mandrels having a passage therein with an orifice at the respective inner end face thereof, said mandrels being movable relative to one another whereby such orifice can be opened or closed to control the flow of a fluid therefrom, said mandrels being movable angularly and axially relative to the mold for pressing a plastic material against the inner surfaces of the mold in response to such angular and axial movement; means for controlling the position of said mandrels relative to one another whereby the passage of fluid from such orifice is controllable; and means for directing a conduit liner fluid to such passage, at least one of said mandrels acting to smooth such fluid against the interior surface of the plastic material so pressed against the inner surfaces of the mold.

13. For use with a conduit mold in conduit-forming apparatus, a bore mandrel having an inner end face and a passage therethrough having an orifice in such inner end face; a trowel mandrel having an inner end face formed for conforming to said first-named inner end face; means for mounting said mandrels in coaxial relationship for movement axially relative to one another within preselected limits, said inner end faces being movable into close engagement for closing such orifice and being separable within such limits for opening such orifice to permit the egress of fluid between said mandrels; means for resiliently urging said mandrels toward one another; means for rotating said mandrels and simultaneously moving same axially relative to the mold; and means for directing a liner fluid to such passage in said bore mandrel.

14. In apparatus of the class described, a bore mandrel having inner and outer end faces and a passage therethrough extending from one end face to the other; a shaft member secured to said bore mandrel and having a passage therethrough which is in communication with said first-named passage; a trowel mandrel having an inner end face formed for conforming to said first-named inner end face of said bore mandrel; said mandrels being in the shape of solids of revolution, the diameter of said trowel mandrel being smaller than that of said bore mandrel; means for mounting said mandrels in coaxial relation for movement axially relative to one another within preselected limits, such inner end faces of said mandrels being movable into close engagement for closing the orifice of the passage in the inner end face of said bore mandrel, said inner end faces being separable within such limits for opening such passage to permit the flow of fluid therefrom to the periphery of said trowel mandrel; means for controlling the position of said mandrels relative to one another; a conduit mold; means, including said shaft, for rotating said mandrels and simultaneously moving same axially relative to said conduit mold for pressing a plastic material, such as concrete or the like, in said mold against the sides of the latter to form a conduit in response to such rotation and relative axial movement of said mandrels; and means for directing a conduit liner fluid to said mandrels via said shaft, such fluid having egress between said mandrels in response to separation of the latter, said trowel mandrel smoothing such fluid against the material so pressed against the sides of said mold by said bore mandrel.

15. In apparatus of the class described, a bore mandrel of cylindrical conformation having inner and outer faces and a passage therethrough extending from one end face to the other; a rigid shaft member secured to said bore mandrel at the outer end face thereof and having a passage therethrough in communication with said first-named passage; a trowel mandrel also of cylindrical conformation and having an inner end face formed for conforming to said first-named inner end face, said trowel mandrel being of smaller diameter than that of said bore mandrel; means for mounting said mandrels in coaxial relation for movement axially relative to one another within preselected limits, said inner end faces of said mandrels being movable into close engagement for closing the passage in said bore mandrel and being separable within such limits for opening such passage to permit the flow of fluid therefrom to the periphery of said trowel mandrel; a cylindrical mold; means for moving said mandrels axially relative to said mold; and means for simultaneously revolving said mandrels.

16. For use with a conduit mold in conduit-forming apparatus, a pair of mandrels, means for mounting said mandrels in coaxial relationship for movement relative to one another within preselected limits, one of said mandrels having a passage therethrough, means for resiliently urging said mandrels toward a preselected relative position in which position such passage is closed, and means for directing a liner fluid under pressure to the passageway in one of said mandrels.

17. In apparatus of the class described, a bore-forming mandrel having a passage therethrough, a shaft member secured to said mandrel coaxially therewith and having a passage therethrough in communication with the passage in said mandrel, the latter being cylindrical in conformation, having a substantially flat inner end face and being of preselected diameter, a trowelling mandrel also of cylindrical conformation and having a diameter less than that of the bore-forming mandrel, said trowelling mandrel being mounted upon the bore-forming mandrel coaxially therewith and having a substantially flat inner end face, the latter being movable directly adjacent to and in engagement with the corresponding face of said bore-forming mandrel, means for resiliently urging such faces of said mandrels into engagement, a conduit form in which said mandrels are operable, such form being adapted to receive a plastic material through which said mandrels are moved thereby pressing such material against said conduit form, such passageways in said shaft and bore-forming mandrel being adapted for conducting a conduit liner fluid, and means for moving said shaft relative to said conduit form.

RAY C. RIFENBURG.

REFERENCES CITED

The following references are of record in the file of this patent:

UNITED STATES PATENTS

| Number | Name | Date |
|---|---|---|
| 907,724 | Boyle | Dec. 29, 1908 |
| 1,838,546 | Halstead | Dec. 29, 1931 |
| 2,143,448 | O'Rourke | Jan. 10, 1939 |